(12) United States Patent
Merrikh et al.

(10) Patent No.: US 10,393,594 B2
(45) Date of Patent: Aug. 27, 2019

(54) THERMOPILE MESH

(71) Applicant: QUALCOMM Incorporated, San Diego, CA (US)

(72) Inventors: Ali Akbar Merrikh, Austin, TX (US); Farsheed Mahmoudi, San Diego, CA (US); Mehdi Saeidi, San Diego, CA (US); Evan Bentley Fleming, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 15/675,604

(22) Filed: Aug. 11, 2017

(65) Prior Publication Data

US 2018/0045580 A1 Feb. 15, 2018

Related U.S. Application Data

(60) Provisional application No. 62/374,626, filed on Aug. 12, 2016.

(51) Int. Cl.
| | |
|---|---|
| *H01L 35/32* | (2006.01) |
| *G01K 7/02* | (2006.01) |
| *G01K 1/02* | (2006.01) |
| *G01K 7/04* | (2006.01) |
| *G06F 17/12* | (2006.01) |

(Continued)

(52) U.S. Cl.
CPC ............ *G01K 7/021* (2013.01); *G01K 1/026* (2013.01); *G01K 7/02* (2013.01); *G01K 7/028* (2013.01); *G01K 7/04* (2013.01); *G01K 2003/145* (2013.01); *G01K 2213/00* (2013.01);

*G01K 2217/00* (2013.01); *G06F 17/12* (2013.01); *G06F 17/16* (2013.01)

(58) Field of Classification Search
CPC .......... G01J 2005/123; G01K 2213/00; G01K 2217/00; G01K 7/02
See application file for complete search history.

(56) References Cited

U.S. PATENT DOCUMENTS 5,689,087 A * 11/1997 Jack .......................... G01J 5/12
136/213
5,718,511 A * 2/1998 Mundt ..................... G01K 3/04
374/137

(Continued)

FOREIGN PATENT DOCUMENTS

GB 2291197 A 1/1996

OTHER PUBLICATIONS

International Search Report and Written Opinion—PCT/US2017/046654—ISA/EPO—dated Nov. 11, 2017.

(Continued)

*Primary Examiner* — Gail Kaplan Verbitsky
(74) *Attorney, Agent, or Firm* — Seyfarth Shaw LLP

(57) ABSTRACT

A semiconductor device may include a semiconductor die having an active region. The semiconductor device may also include a thermocouple mesh proximate to the active region. The thermocouple mesh may include a first set of wires of a first material extending in a first direction, and a second set of wires of a second material. The second material may be different from the first material. In addition, the second set of wires may extend in a second direction different than the first direction of the first wires.

28 Claims, 12 Drawing Sheets

(51) Int. Cl.
  *G06F 17/16* (2006.01)
  *G01K 3/14* (2006.01)

(56) References Cited

U.S. PATENT DOCUMENTS

| | | | | |
|---|---|---|---|---|
| 5,746,513 | A * | 5/1998 | Renken | G01K 13/00 136/230 |
| 5,909,004 | A | 6/1999 | Hedengren et al. | |
| 6,190,040 | B1 * | 2/2001 | Renken | G01K 1/026 374/133 |
| 6,325,536 | B1 * | 12/2001 | Renken | G01K 11/3213 374/131 |
| 6,348,807 | B2 * | 2/2002 | Black | G01R 22/04 324/512 |
| 6,744,346 | B1 * | 6/2004 | Akram | G01K 1/026 257/467 |
| 6,915,589 | B2 * | 7/2005 | Sun | G01D 11/30 33/562 |
| 7,190,250 | B2 * | 3/2007 | Parsons | H01L 22/34 338/22 R |
| 7,924,408 | B2 * | 4/2011 | DiBiase | G03F 7/70875 355/72 |
| 8,029,186 | B2 * | 10/2011 | Hamann | H01L 23/34 324/537 |
| 8,114,686 | B2 * | 2/2012 | Habib | G01K 7/16 257/467 |
| 8,235,593 | B2 * | 8/2012 | Sri-Jayantha | G06F 1/206 374/110 |
| 8,517,605 | B2 * | 8/2013 | Grayson | G01K 1/026 374/120 |
| 8,592,765 | B2 * | 11/2013 | Forg | G01J 5/02 250/338.1 |
| 8,927,909 | B2 | 1/2015 | Le Neel et al. | |
| 9,653,144 | B1 | 5/2017 | Man et al. | |
| 2001/0013789 | A1 * | 8/2001 | Black | G01R 22/04 324/762.03 |
| 2007/0046284 | A1 * | 3/2007 | Renken | H01L 21/67253 702/58 |
| 2008/0204678 | A1 * | 8/2008 | DiBiase | G03F 7/70633 355/30 |
| 2009/0166794 | A1 * | 7/2009 | Mowry | G01K 1/026 257/470 |
| 2011/0110396 | A1 | 5/2011 | Grayson et al. | |
| 2012/0304137 | A1 * | 11/2012 | Pramono | G06F 17/5036 716/109 |
| 2014/0376595 | A1 * | 12/2014 | Daley | H01L 28/20 374/185 |

OTHER PUBLICATIONS

Liu H., et al., "Towards On-Chip Time-Resolved Thermal Mapping with Micro-/Nanosensor Arrays", Nanoscale Research Letters, Dec. 1, 2012, pp. 1-6, XP055419979, New York, DOI:10.1186/1556-276X-7-484, Retrieved from the Internet: URL:https://nanoscalereslett.springeropen.comttrackfpdf/10.1186/1556-276X•7•484?site= nanoscalereslett.springeropen.com, 6 pages.

\* cited by examiner

THERMOPILE MESH

CROSS-REFERENCE TO RELATED APPLICATION

This application claims the benefit of U.S. Provisional Patent Application No. 62/374,626, filed on Aug. 12, 2016, entitled "THERMOPILE MESH," the disclosure of which is expressly incorporated by reference herein in its entirety.

BACKGROUND

Technical Field

This application relates to thermal mitigation and, more specifically, to systems and methods for improved spatial resolution of temperature sensing on a system on chip (SoC) device.

Background

A conventional modern smartphone may include a system on chip (SoC) that includes a processor as well as other operational circuits. For example, in a smartphone, an SoC, which is an integrated circuit (IC), may include a processor, a digital signal processor (DSP), a graphics processing unit (GPU), a memory, and a modem (e.g., LTE modem) on one semiconductor die. The die is encapsulated within a package, where the package is mounted on a printed circuit board (PCB) internal to the phone. The phone also includes an external housing and a display, such as a liquid crystal display (LCD). A human user, when using the phone, physically touches the external housing and the display.

As the SoC operates, it generates heat. The heat generated within the SoC of a smartphone may reach temperatures of 80° C.-100° C. Furthermore, conventional smartphones do not include fans to dissipate heat. During use, such as when a human user is watching a video on a smartphone, the SoC generates heat, and the heat is spread through the internal portions of the phone to an outside surface of the phone.

Conventional smartphones include algorithms to control hot spots by reducing a frequency of operation of the SoC when a temperature sensor in the SoC reaches a threshold level. Unfortunately, the SoC temperature is difficult to accurately measure.

For example, current methodologies may rely on diode temperature sensors located within a silicon active layer to detect an on-chip temperature. Active layer design constraints, however, may severely limit the number of possible diodes. For example, the number of diodes that may be located in one SoC central processing unit (CPU) core may be limited to two diodes. Unfortunately, hot spot(s) location(s) depend on dynamic operating conditions and cannot be assumed to occur in a given location(s). Consequently, even with strategic diode placement, on-chip peak temperature estimation is very crude. This on-chip peak temperature estimation leads to overly-conservative performance throttling because true peak temperatures and peak temperature locations are not known.

SUMMARY

A semiconductor device may include a semiconductor die having an active region. The semiconductor device may also include a thermocouple mesh proximate to the active region. The thermocouple mesh may include a first set of wires of a first material extending in a first direction, and a second set of wires of a second material. The second material may be different from the first material. In addition, the second set of wires may extend in a second direction different than the first direction of the first wires.

A method of estimating a thermal map of a semiconductor die may include receiving a differential voltage from a thermocouple mesh proximate to an active region of the semiconductor die. The method may also include calculating a temperature of the active region based on the differential voltage and an effective Seebeck coefficient.

A semiconductor device may include a semiconductor die having an active region. The semiconductor device may also include a means for sensing a temperature, proximate to the active region. The sensing means may include a first set of wires of a first material extending in a first direction, and a second set of wires of a second material. The second material may be different from the first material. In addition, the second set of wires may extend in a second direction different than the first direction.

A non-transitory computer-readable medium may have program code recorded thereon for estimating a thermal map of a semiconductor die. The computer-readable medium may include program code to receive a differential voltage from a thermocouple mesh proximate to an active region of the semiconductor die. The computer-readable medium may also include program code to calculate a temperature of the active region based on the differential voltage and an effective Seebeck coefficient.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
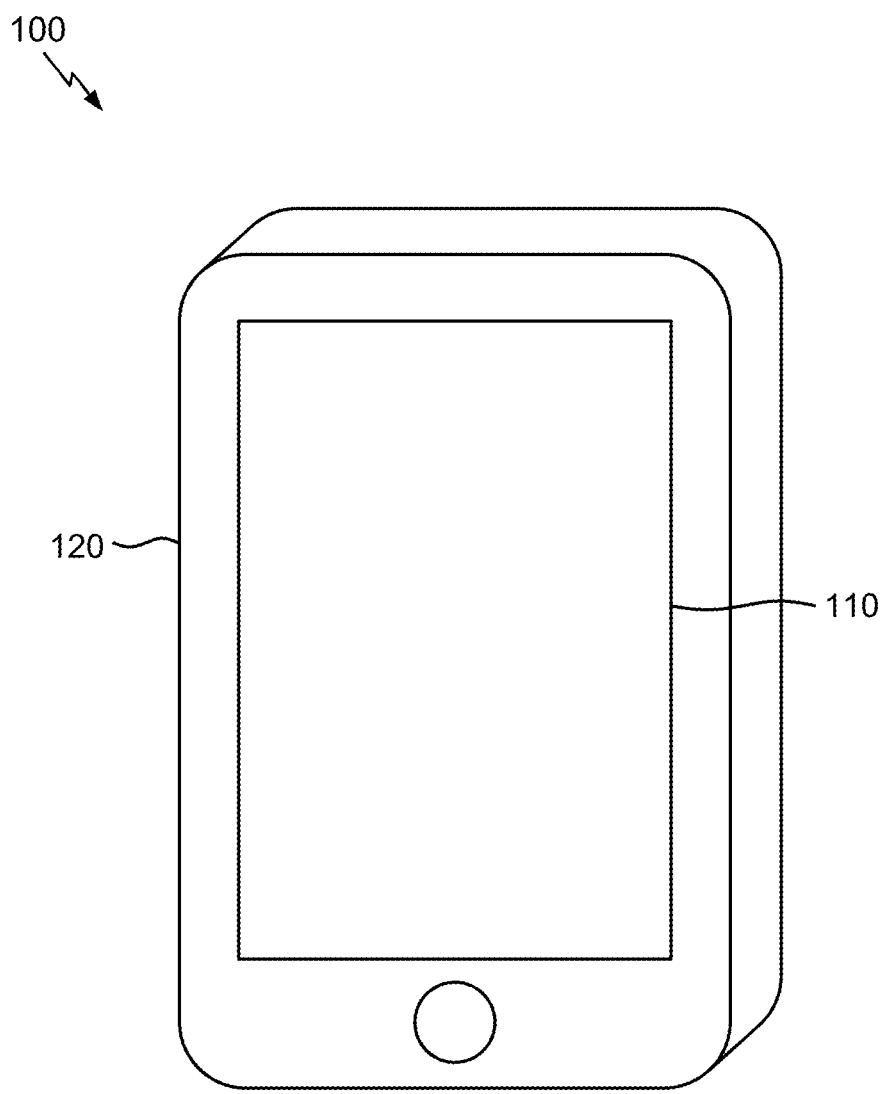
FIG. 1 is a perspective view of an example computing device that may perform a method.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As described herein, the use of the term "and/or" is intended to represent an "inclusive OR", and the use of the term "or" is intended to represent an "exclusive OR". As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations.

It is desirable to sense temperature of a system on chip (SoC) in smartphones. Modern microprocessor control algorithms in smartphones make use of the temperature of the SoC to mitigate performance. As a result, temperature accuracy is important in reliability assessment of products.

Temperature sensors are conventionally used to sense a temperature of an SoC in a smartphone. Exemplary temperature sensors include p-channel metal oxide semiconductors (PMOS) or p-type, n-type, p-type (PNP) thermal diodes or thermal transistors. Other temperature sensors include n-channel metal oxide semiconductors (NMOS) or n-type, p-type, n-type (NPN) thermal diodes or thermal transistors. These temperature sensors may be located in sub-optimal areas of an active layer of a semiconductor device (e.g., made of silicon). This sub-optimal placement generally results in insufficient spatial coverage of the sensors, leading to misleading temperature readings. These conventional temperature sensing implementations, therefore, produce inaccurate temperature measurements. In addition, conventional implementations for detecting hotspots involve a high-density placement of many temperature sensors on already crowded parts of the die, which would interfere with a myriad of other components and routing lines in those parts.

Aspects of the present disclosure are directed to a thermopile mesh structure (e.g., thermopile mesh) that covers a desirable surface area (e.g., an entire surface area) of an active layer. A mesh structure that covers an active area of an SoC results in reduced spatial error relative to current methods. The thermopile design also reduces back-end calibration processes that are costly, thereby achieving product cost benefits.

The process flow for semiconductor fabrication of an integrated circuit device may include front-end-of-line (FEOL) processes, middle-of-line (MOL) (also referred to as middle-end-of-line (MEOL)) processes, and back-end-of-line (BEOL) processes. These processes result in three substantially planar layers atop the semiconductor substrate. The FEOL processes may include the set of process steps that form the active devices, such as transistors, capacitors, diodes. Note that these active devices generate most of the heat produced by the IC. The MEOL processes may include the set of process steps that enable connection of the transistors to BEOL interconnects. These steps include silicidation and contact formation as well as stress introduction. The BEOL processes may include the set of process steps that form the interconnects that tie the independent transistors and form circuits.

In one aspect of the present disclosure, the mesh structure includes a planar mesh, or grid, of two dissimilar conductive materials placed over an active region (e.g., front-end-of-line (FEOL) layer) of the SoC. For example, the mesh structure may be composed of first parallel wires of a first metal arranged in a first direction and second parallel wires of a second, different, metal arranged in a second direction orthogonal to the first direction. The first and second parallel wires form thermocouples where the wires intersect. A thickness of the thermocouple mesh structure may be in the order of 100 nanometers.

Various temperature sensing implementations include systems and methods to use a temperature reading from on-chip and in-package to better estimate the chip temperature and detect the location of hotspots. In one aspect, a package includes an SoC that is physically within the package. The package may be formed by any means and include any additional components, which may be interconnected by any means.

In some implementations, the voltage at each perimeter wire terminal of the mesh is measured. From these measured voltages, the temperatures are derived at all interior and exterior mesh junctions (nodes). For example, a node may be defined as an intersection between the two dissimilar metals. The transformation between voltage to temperature relies upon the Seebeck effect, which is a phenomenon in which a temperature difference between two coupled dissimilar electrical conductors or semiconductors produces a voltage difference between the two substances. It should be noted that, although the mesh may be used to calculate absolute temperatures (especially when provided with one or more reference temperatures), it may also be used to detect relative hotspots without regard to their actual scalar value (particularly when a reference temp is unavailable/not used).

Figure 4A:
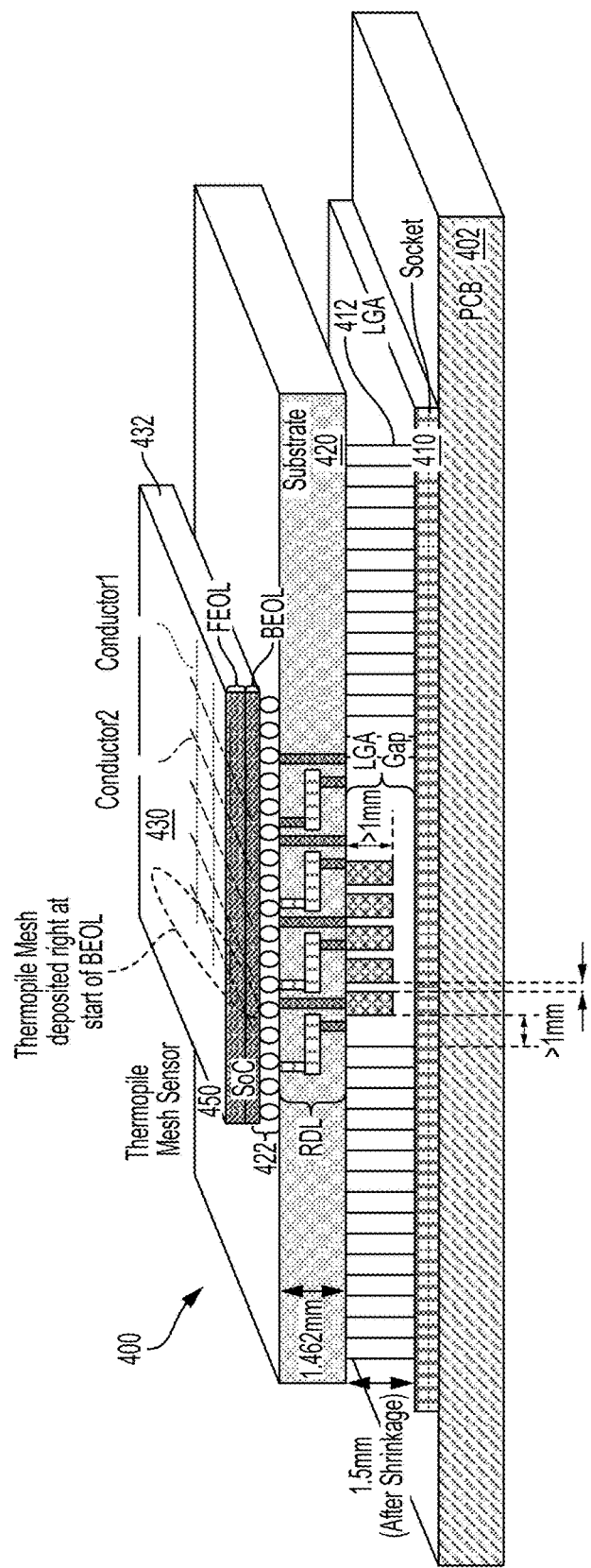
FIGS. 4A and 4B are cross-sectional perspective views of examples of a package and printed circuit board architecture including system on chip (SoC) thermocouple mesh structures, according to aspects of the present disclosure.
Figure 4B:
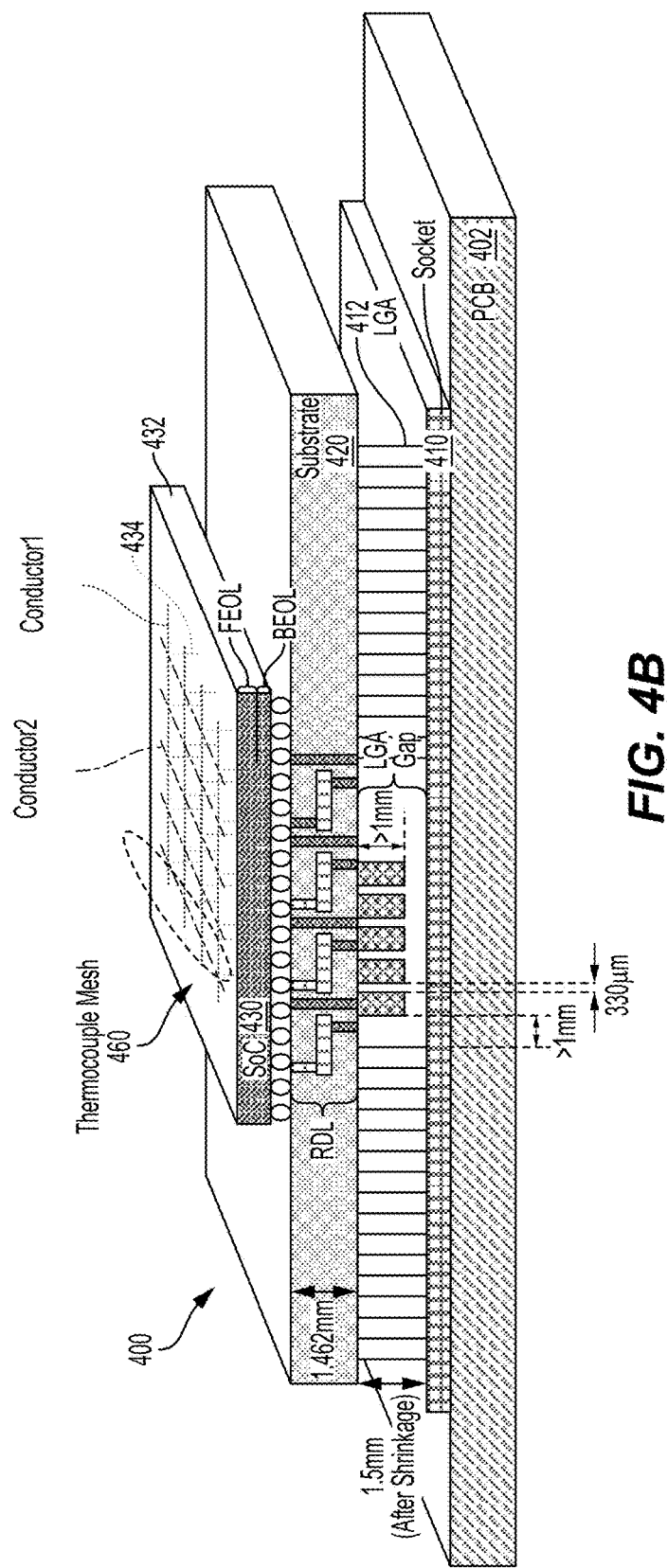

The mesh structure (e.g., thermocouple mesh structure) can be placed at different regions of the system on chip, so long as the mesh structure covers the desirable portions of the active region of a semiconductor device (e.g., modem controller die). One or more of the nodes (e.g., where the two different wire materials intersect) of the mesh may be connected to the system on chip with through-silicon vias (TSVs). For example, a thermopile mesh may be placed or deposited at a backside of the semiconductor device (e.g., a silicon substrate), as shown in FIG. 4A, and/or in a middle-of-the-line (MOL) region of the semiconductor device, as shown in FIG. 4B. An interposer mask may be used to separate the thermocouple mesh from contacting certain interconnects within the semiconductor device.

When the thermopile is placed at the BEOL, for example, the voltage differences at specified wire terminals may be communicated to the system on chip through the vias. For example, the voltage differences on each of the wire terminals are processed through an amplifier. The result (e.g., the output of the amplifier) is provided to an analog-to-digital converter to convert the result from analog to digital to be processed at a controller to determine the temperature at various regions of the active layer of the system on chip based on an estimate at a controller (e.g., a thermal management unit).

The process described above may be embodied as computer executable code that is read and executed by a kernel process of the processor. In another aspect, the process may be embodied as a hardware process built into the processor. In many aspects, however, thermal changes at the SoC are on the order of seconds or minutes, so that software is sufficiently fast-acting.

An example method may be performed by a software kernel of the SoC that is tasked with thermal management. The SoC is in electrical communication with the thermocouple mesh and continually measures temperature using the thermocouple mesh. When the thermal management process detects a hotspot in a particular region of the SoC, the thermal management process may decrease the frequency of operation of that particular region of the SoC (or of the entire SoC), thereby generating less heat by the particular region and within the SoC and the surrounding package.

FIG. 1 is a perspective view of an example of a computing device 100 in which various aspects may be implemented. In the example of FIG. 1, the computing device 100 is shown as a smartphone. The scope, however, is not limited to a smartphone, as other aspects may include a tablet computer, a laptop computer, or other suitable device. In fact, the scope includes any particular computing device, whether mobile or not. Aspects including battery-powered devices, such as tablet computers and smartphones, may benefit from the concepts disclosed. Specifically, the concepts described provide techniques for estimating heat inside the computing device 100.

As shown in FIG. 1, the computing device 100 includes an exterior surface 120 (e.g., a skin) that comes into contact with hands or other parts of the body of a human user. The exterior surface 120 includes, for example, metal and plastic surfaces as well as the surfaces that make up a display unit 110. In one example, the display unit 110 is a capacitive liquid crystal display (LCD) touchscreen, so that the surface of the display unit 110 is either glass or plastic-coated glass. The exterior surface 120, therefore, includes the various external surfaces such as the display unit 110 and the other parts of the external housing. Although not shown in FIG. 1, the backside of the computing device 100 includes another part of the outer surface of the device, and, specifically, another part of the exterior housing, which may be arranged in a plane parallel to a plane of the display unit 110.

FIG. 1 does not show a computer processor, but it is understood that a computer processor is included within the computing device 100. In one example, the computer processor is implemented in a SoC within a package, and the package is mounted to a printed circuit board within the physical housing. In conventional smartphones, the package including the processor is mounted in a plane parallel to a plane of the display surface and a plane of the back surface. Examples of packages and printed circuit boards are discussed in more detail with respect to FIGS. 4A and 4B.

As a computer processor operates, it produces heat, which dissipates throughout the physical structure of the computing device 100. Depending on the specific thermal properties of the computing device 100, heat from the operation of the processor may generate hot spots within the computing device 100. The computer processor within the computing device 100 provides functionality to control the hot spots of the computing device 100 by determining relevant temperature and adjusting a frequency and/or voltage of one or more IC components, if appropriate.

Figure 2:
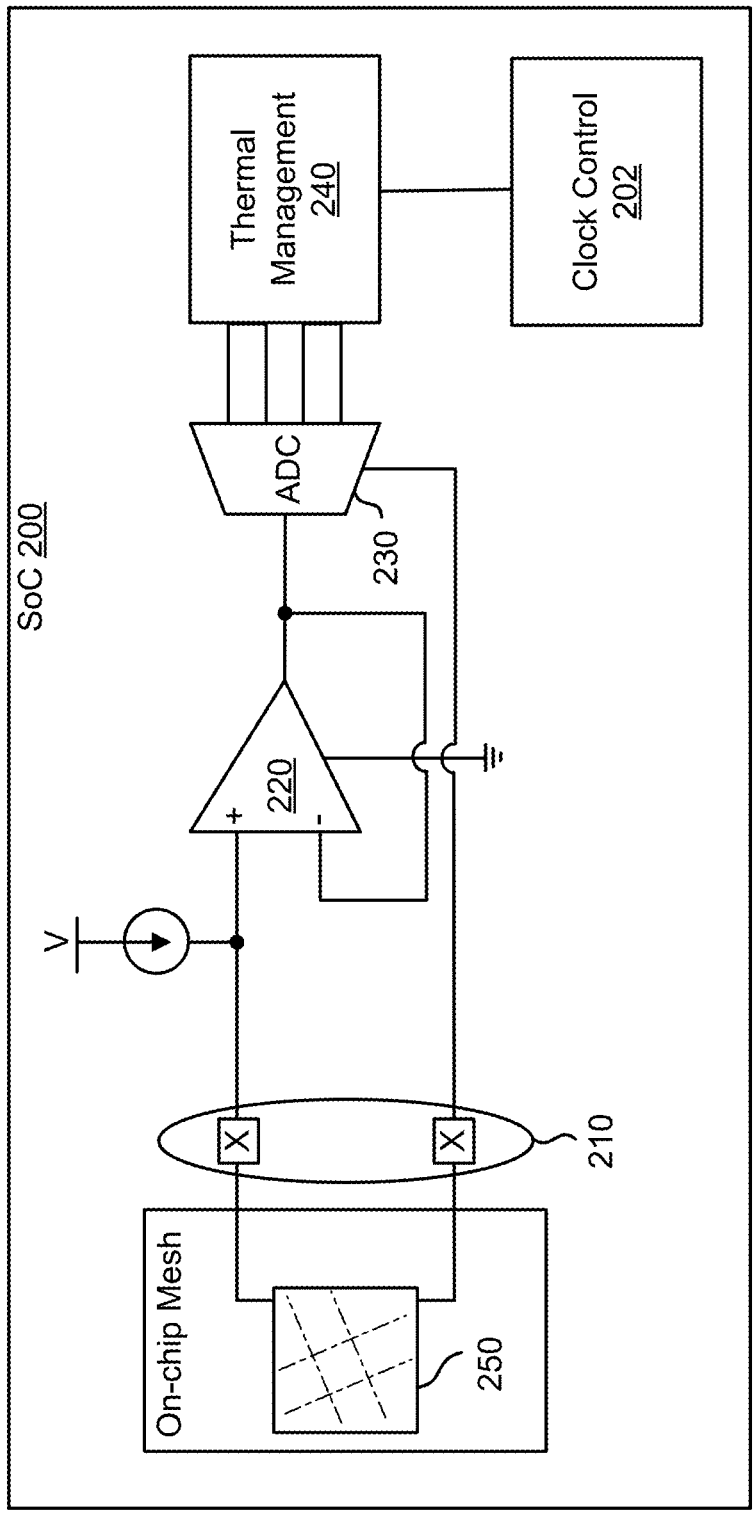
FIG. 2 is a simplified schematic diagram of thermal management circuitry and logic, according to one aspect of the present disclosure.

FIG. 2 is a simplified schematic diagram of an example system that performs methods of a described aspect. The system of FIG. 2 includes a thermocouple mesh 250, which is further illustrated in FIG. 3A, according to one aspect of the present disclosure. The thermocouple mesh 250 may be part of a thermopile mesh sensor (450/460), as shown, for example, in FIGS. 4A and 4B. The thermocouple mesh 250 is shown, in this aspect, in an area labeled "on-chip mesh," and can include a thermopile mesh. Examples of on-chip configurations are shown in more detail in FIGS. 4A and 4B.

The thermocouple mesh 250 is in electrical communication with on-chip circuitry through use of conductive contacts 210. On-chip circuitry, in this example, includes circuits and logic that are implemented within an SoC 200. The on-chip circuitry includes an operational amplifier 220, which has a non-inverting input (+) and an inverting input (−). The non-inverting input is in communication with the thermocouple mesh 250. The operational amplifier 220 includes negative feedback, so that the output terminal is coupled to the inverting input. This arrangement smooths out the voltage reading. A voltage at the non-inverting input is indicative of a temperature experienced by the thermocouple mesh 250. Therefore, the output terminal of the operational amplifier 220 provides an analog signal that is indicative of the temperature experienced by the thermocouple mesh 250.

The analog output signal from the operational amplifier 220 is received by an analog-to-digital converter (ADC) 230. The ADC 230 produces a digital signal indicative of the temperature information received from the operational amplifier 220. The ADC 230 passes the digital signal to a thermal management unit 240 for further processing. Thermal management unit 240, in one example, includes hardware logic to provide thermal management services to the SoC 200.

In another inventive aspect, the thermal management unit 240 represents thermal management processes that are provided by a software kernel of the SoC 200. For instance, the SoC 200 may include a software kernel that operates when the SoC 200 is powered up and receiving a clock signal. The thermal management unit 240 may include a software process that is built into the kernel to perform the method described in FIG. 9. Nevertheless, either hardware or software or a combination thereof may perform the processes described for providing thermal management.

The thermal management unit 240 receives the digital signal from the ADC 230. The digital signal may include data indicative of a temperature measured by the thermocouple mesh 250. The thermal management unit 240 includes at least one programmed temperature threshold that corresponds to a package temperature associated with an undesirable rise in a SoC temperature. The thermal management unit 240 receives the digital signal from the ADC 230 and compares temperature information of that digital signal to the programmed temperature threshold. If the temperature is below the temperature threshold, then the thermal management unit 240 may simply continue monitoring on a periodic basis or at other appropriate times. The thermal management unit 240, however, may reduce an operating parameter of the SoC 200 in response to determining that the temperature indicated by the digital signal exceeds the threshold. Examples for reducing an operating parameter include reducing a voltage and/or a frequency of operation of the SoC 200.

The thermal management unit 240 may also reduce the clock frequencies provided to the cores or increase the clock frequencies provided to the cores by sending commands to a clock control unit 202. The clock control unit 202 may be a physical part of the SoC 200 or separate therefrom, as the scope is not limited to any particular clocking architecture. The clock control unit 202 may control a phase locked loop (PLL) or other suitable circuit that provides a periodic clock signal for raising or lowering the operating frequency of one or more of the cores of the SoC 200.

In one example, the thermal management unit 240 compares the temperature to the temperature threshold and determines that it is appropriate to lower a frequency of operation. In response, the thermal management unit 240 sends a control signal to the clock control unit 202 instructing the clock control unit 202 to reduce the frequency of operation. Furthermore, the thermal management unit 240 may continue monitoring the temperature data from the digital signal and compare it to either the same or a different threshold. When the temperature drops below either the same or a different threshold, the thermal management unit 240 may increase the frequency of operation by sending another control signal to the clock control unit 202.

The temperature threshold (or thresholds) that are used by the thermal management unit 240 may depend upon the particular thermal conductive properties of a given device. A given device, such as the computing device 100 of FIG. 1, is made of various physical materials that cause the device to have particular thermal conductive properties. For instance, some computing devices may include a specially designed heat spreader that is internal to the housing and placed between an inside surface of the housing and the computer processor within the device. A well-functioning heat spreader may keep the heat that is generated by the SoC from being concentrated at one area of the housing, thereby maintaining a more uniform heat profile around the surface of the computing device. Because the heat is spread to more surface area, the heat may be removed by ambient air more efficiently, thereby allowing more heat generation by the SoC before thermal mitigation becomes appropriate.

As noted above, current methodologies may rely on diode temperature sensors located within a silicon active layer to detect an on-chip temperature. Active layer design constraints, however, may severely limit the number of possible diodes. For example, the number of diodes that may be located in one SoC CPU core may be limited to two diodes. Unfortunately, hot spot(s) location(s) depend on dynamic operating conditions and cannot be assumed to occur in a given location(s). Consequently, even with strategic diode placement, on-chip peak temperature estimation is very crude. This on-chip peak temperature estimation leads to overly-conservative performance throttling because true peak temperatures and peak temperature locations are not known.

Figure 3A:
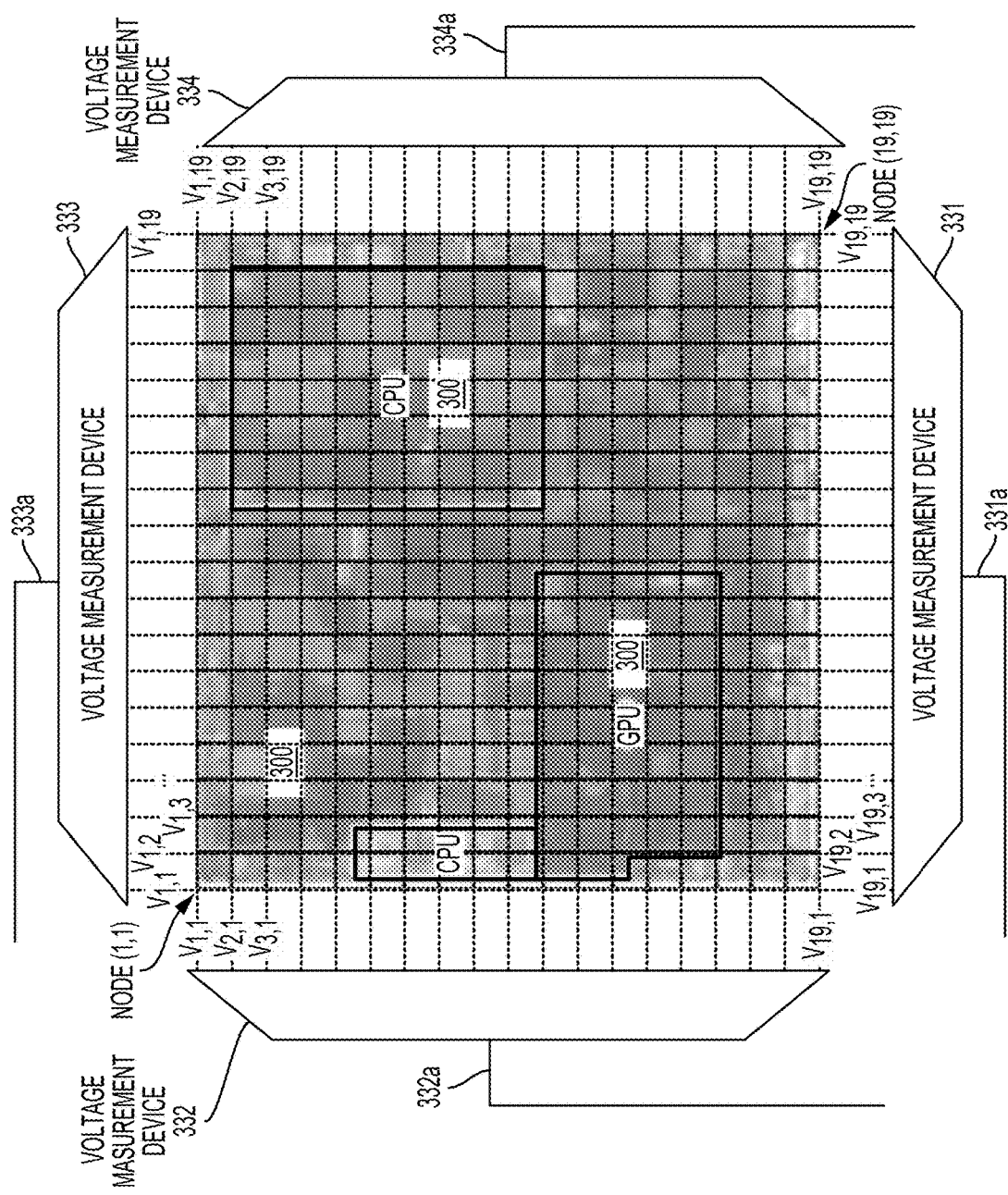
FIGS. 3A and 3B are simplified schematic diagrams further illustrating the thermocouple mesh of FIG. 2, according to aspects of the present disclosure.
Figure 3B:
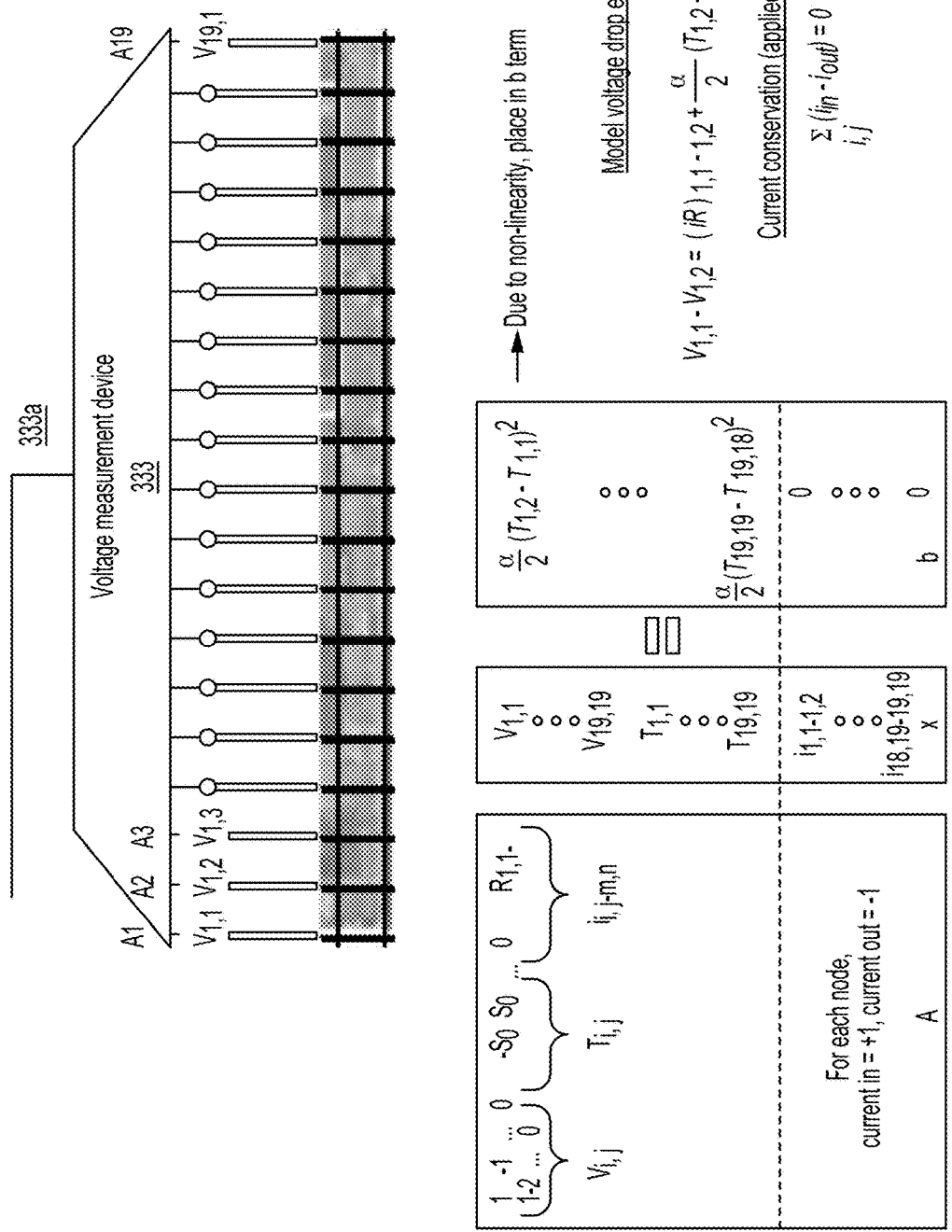

FIGS. 3A and 3B are simplified schematic diagrams further illustrating the thermocouple of FIG. 2. Aspects of the present disclosure address the thermal placement issues noted above by providing a high-spatial-resolution thermal sensor, which may be referred to as a thermopile mesh sensor, a thermocouple mesh sensor, or a thermocouple mesh structure. A thermopile mesh sensor 300 is shown in FIG. 3A. The thermopile mesh sensor 300 may use voltage signals produced by temperature variations (e.g., the Seebeck effect) to compute on-chip temperatures with improved spatial resolution. This improved resolution leads to more accurate knowledge of component (e.g., a CPU core 310, a GPU core 320, a communications module, etc.) temperatures, which has ramifications for both improved mitigation strategies and device reliability In this example, the thermopile mesh sensor 300 may detect voltage signals (e.g., $V_{1,1}, V_{1,2}, V_{1,3}, \ldots, V_{1,19}$), (e.g., $V_{1,19}, V_{2,19}, V_{3,19}, \ldots, V_{19,19}$), (e.g., $V_{19,1}, V_{19,2}, V_{19,3}, \ldots, V_{19,19}$), and (e.g., $V_{1,1}, V_{2,1}, V_{3,1}, \ldots, V_{19,1}$) at a periphery of the thermopile mesh sensor 300 using voltage measurement devices 331, 332, 333, and 334. In this example, the measured voltages at each of the specified peripheral nodes may be processed through the operational amplifier (not shown) of the voltage measurement devices 331, 332, 333, and 334. The result (e.g., the output of the amplifier) may be provided to an analog-to-digital converter (not shown) to convert the result from analog to digital. Signal lines 331a, 332a, 332a, and 334a of the voltage measurement devices 331, 332, 333, and 334 may feed the digital voltage values to be processed at a controller (e.g., thermal management unit 240). The controller may determine the temperature at various regions (e.g., a set of internal nodes located internal to the thermopile mesh sensor 300) of the active layer of an SoC based on an estimation at the controller (e.g., thermal management unit 240).

These digital voltages are then used for determining on-chip junction temperatures without affecting, for example, an SoC chip core (e.g., the CPU core 310, the GPU core 320, etc.) This increased number of voltage measurements (e.g., 72) leads to substantially more known temperatures for the thermopile mesh sensor 300 than individual thermocouples. In addition, unlike thermal sensor diodes, no sense currents are needed to power the thermopile mesh sensor 300, which generates its own electromagnetic field (EMF) caused by the Seebeck effect (see FIG. 6A). Thus, no heat generation is created by the thermopile mesh sensor 300 when placed within the active region of an SoC chip core, thereby avoiding adverse effects of self-heat generation on the accuracy of temperature detection.

FIG. 3B is simplified schematic diagram illustrating a portion of the thermopile mesh sensor 300 and a voltage measurement device of FIG. 3B, according to one aspect of the present disclosure. In this example, mesh lines (e.g., traces) of the thermopile mesh sensor 300 are extended from the peripheral nodes to one of the voltage measurement devices 333. The voltage measuring devices (e.g., 333) should be located in a region of negligible thermal gradients such that all terminals for a given voltage measuring device can be assumed to be at a single temperature. The voltage measurement device (e.g., 333) may compute a voltage measurement by sequentially measuring voltages along the perimeter of the thermopile mesh sensor 300. Once each of the voltages are measured, temperatures are calculated using a thermo-physical model algorithm using the matrix equations shown in FIG. 3B and the process shown in FIG. 3C.

Figure 3C:
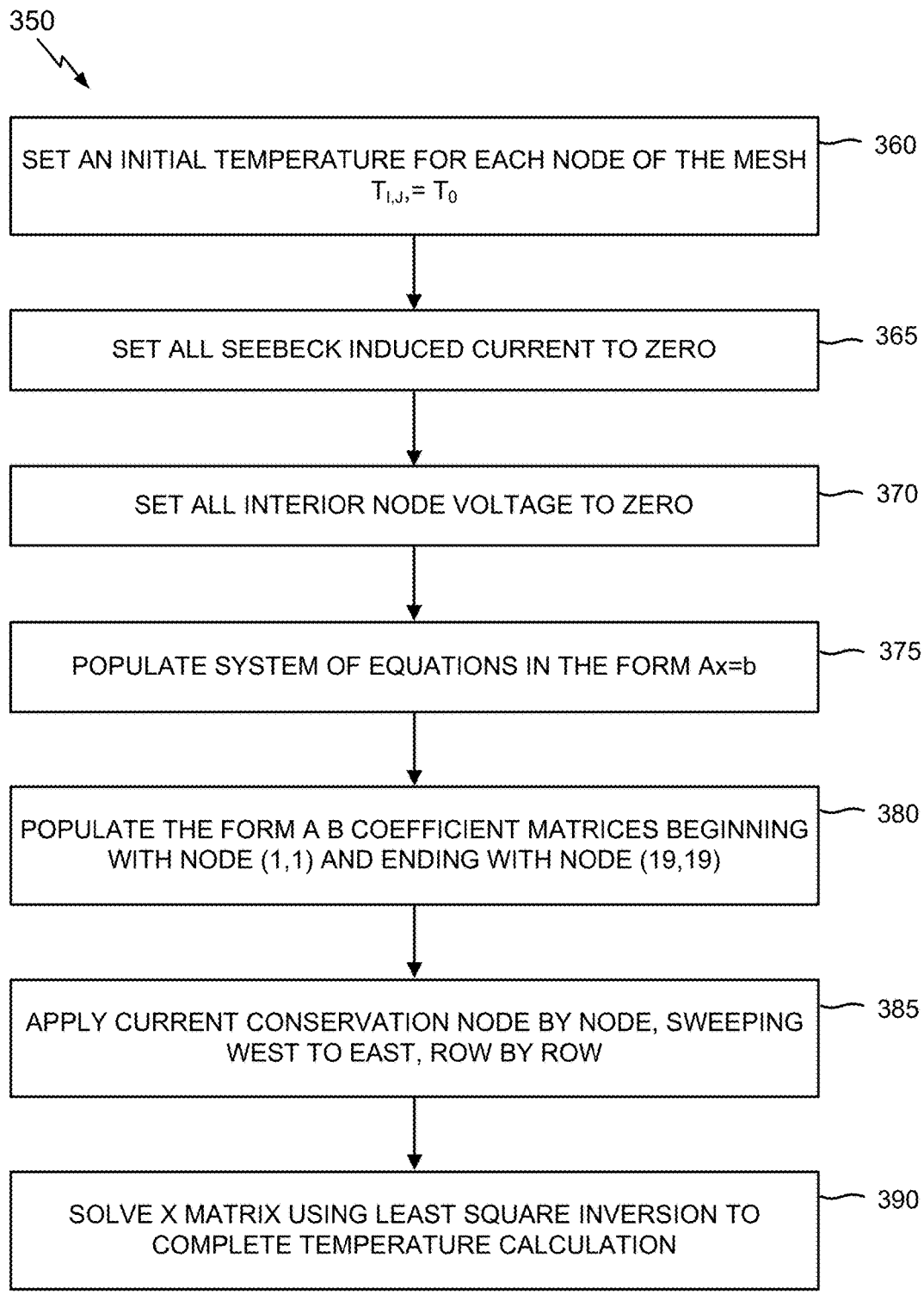
FIG. 3C is a flow diagram of an example method of a thermo-physical model temperature calculation process, according to aspects of the present disclosure.

FIG. 3C is a flow diagram of an example method 350 of a thermo-physical model temperature calculation process, according to aspects of the present disclosure. At block 360, an initial temperature guess is applied for each node of the mesh $T_{i,j}=T_0$, where $T_0$ can be any arbitrary temperature (e.g., $T_{i,j}=T_0=0°$ C.). At block 365, all Seebeck induced currents are initially set to zero. A block 370, all interior node voltages are initially set to zero. At block 375, a system of equations in the form of Ax=b is populated. In this example, b represents known values, x represents unknown values, and A is the coefficient matrix. The structure of Ax=b is done via application of the model voltage drop and current conservation equations shown in FIG. 3B.

Referring again to FIG. 3C, at block 380, starting at node (1,1), the voltage drop equation is used to populate the A coefficient matrix and b matrix as shown in FIG. 3B. This process is repeated for each pair of nodes sweeping first west to east row by row and then north to south, column by column, as shown in FIG. 3A. At completion, the A matrix and b matrix are populated to the dashed line shown in FIG. 3B. At block 385, current conservation is subsequently applied, node by node, sweeping west to east row by row, as shown in FIG. 3A. At block 390, once A and b are fully populated, x is solved via least squares matrix inversion. Multiple iterations may be performed due to non-linearity until convergence is achieved. At this point temperature calculation is complete ($T_{1,1}, \ldots, T_{19,19}$).

The thermopile mesh sensor 300 may be used for high resolution temperature mapping, which improves on-chip hot spot characterization. This on-chip hot spot characterization enables higher performance (e.g., less conservative throttling), better device reliability, as well as useful device feedback. In addition, implementing the thermopile mesh sensor is flexible, which readily enables incorporation into existing semiconductor fabrication process flows. For example, the thermopile mesh sensor 300 may use existing process flow materials and deposition methods. In addition, the thermopile mesh sensor can be incorporated at different process flow stages (e.g., a front-end-of-line (FEOL) region, a middle-of-line (MOL) region, a back-end-of-line (BEOL) region, as a standalone interposer, or in a gap in a land grid array (LGA) supporting a package/interposer of the SoC. Allowing overlapping metals simplifies design/manufacturing challenges with an array of thin film thermocouples.

FIGS. 4A and 4B are cross-sectional perspective views of examples of an IC system architecture 400 including different locations of system on chip (SoC) thermopile mesh sensors, according to aspects of the present disclosure. As shown in FIGS. 4A and 4B, the IC system architecture 400 includes a PCB 402 supporting a socket 410, including a land grid array (LGA) 412. The LGA 412 may include an LGA gap, as shown. A substrate 420 (e.g., an interposer substrate) is on the LGA 412 and includes a redistribution layer (RDL). An SoC 430 (e.g., a multicore die), including a thermopile mesh sensor 450, is electrically coupled to the substrate 420 through interconnects 422 (e.g., solder balls).

In this aspect of the present disclosure, the thermopile mesh sensor (450/460) is composed of two different metals deposited as a thin grid structure between insulating layers. In this example, a grid structure of the thermopile mesh sensor (450/460) is composed of a first conductor (Conductor 1) of a first material and a second conductor (Conductor 2) of a second material different from the first material. The thermopile mesh sensor 450 may be composed of a first set of wires (Conductor 1) of a first material extending in a first direction, and a second set of wires (Conductor 2) of a second material, different from the first material, extending in a different direction relative to the first direction.

As shown in FIG. 4A, a thermopile mesh sensor 450 can be located in a middle-of-line (MOL) region, between a front-end-of-line (FEOL) region and a back-end-of-line (BEOL) region of the SoC 430. In this example, the thermopile mesh sensor 450 may be fabricated using an MOL interconnect layer (e.g., metal zero (M0)). Alternatively, the thermopile mesh sensor 450 may be fabricated using a BEOL interconnect layer (e.g., metal 1 (M1), metal two (M2), etc.).

As shown in FIG. 4B, a thermopile mesh sensor 460 can be located on a semiconductor substrate 432 of the SoC 430. In this example, the thermopile mesh sensor 460 may be deposited on a front-side surface of the semiconductor substrate 432 (e.g., a silicon substrate) of the SoC 430. The thermopile mesh sensor 460 may include wire segments, having varied lengths, in which the wire segments are interconnected at varying angles to other wire segments throughout a thermopile mesh structure. In addition, through-substrate vias (TSVs) 434 may be plated copper and/or the wire terminals of the first and second conductors of the thermopile mesh to carry a junction voltage through the substrate for computing a junction temperature by components in the active region of the SoC 430.

For example, the voltage differences at the desirable nodes are communicated to the SoC 430 through the through-substrate vias 434. As shown in FIG. 3, the voltage differences on each of the specified nodes may be processed through the operational amplifier 220. The result (e.g., the output of the amplifier) may be provided to an analog-to-digital converter (ADC) 230 to convert the result from analog to digital to be processed at a controller (e.g., thermal management unit 335) to determine temperature at various regions of the active layer of the SoC 430 based on an estimation at the controller (e.g., thermal management unit 335).

While FIGS. 4A and 4B illustrate formation of the thermopile mesh sensor (450/460) in/on the SoC 430, aspects of the present disclosure are not limited to these arrangements. For example, the thermopile mesh sensor (450/460) may be formed in the substrate 420. In particular, the thermopile mesh sensor (450/460) may be formed in the redistribution layer (RDL) of the substrate 420. Alternatively, the thermopile mesh sensor (450/460) may be formed in the LGA gap. Still other arrangements of the thermopile mesh sensor (450/460) are also contemplated. For example, the thermopile mesh may be formed in another interposer layer placed above or below the SoC 430

Furthermore, although Conductor 1 is orthogonal to Conductor 2 to form the thermopile mesh sensor (450/460) as a rectangular grid structure, it should be recognized that determining the temperature is not limited to an orthogonal, fixed grid spacing mesh. Accordingly, other shapes are contemplated, according to aspects of the present disclosure. For example, a grid with variable node spacing and/or variable angles between Conductor 1 and Conductor 2 is envisioned to, for example, control mesh density in locations of interest. In another envisioned configuration, Conductor 1 and/or Conductor 2 may have an elliptical shape or other shape. Additionally, the various segments of Conductor 1 and/or Conductor 2 may be composed of different materials. In addition, the mesh may comprise interconnected side-by-side sub-meshes. Furthermore, although shown as a single rectangular grid, the thermopile mesh sensor (450/460) may be composed of a multilayer grid structure, for example, as shown in FIG. 5.

Figure 5:
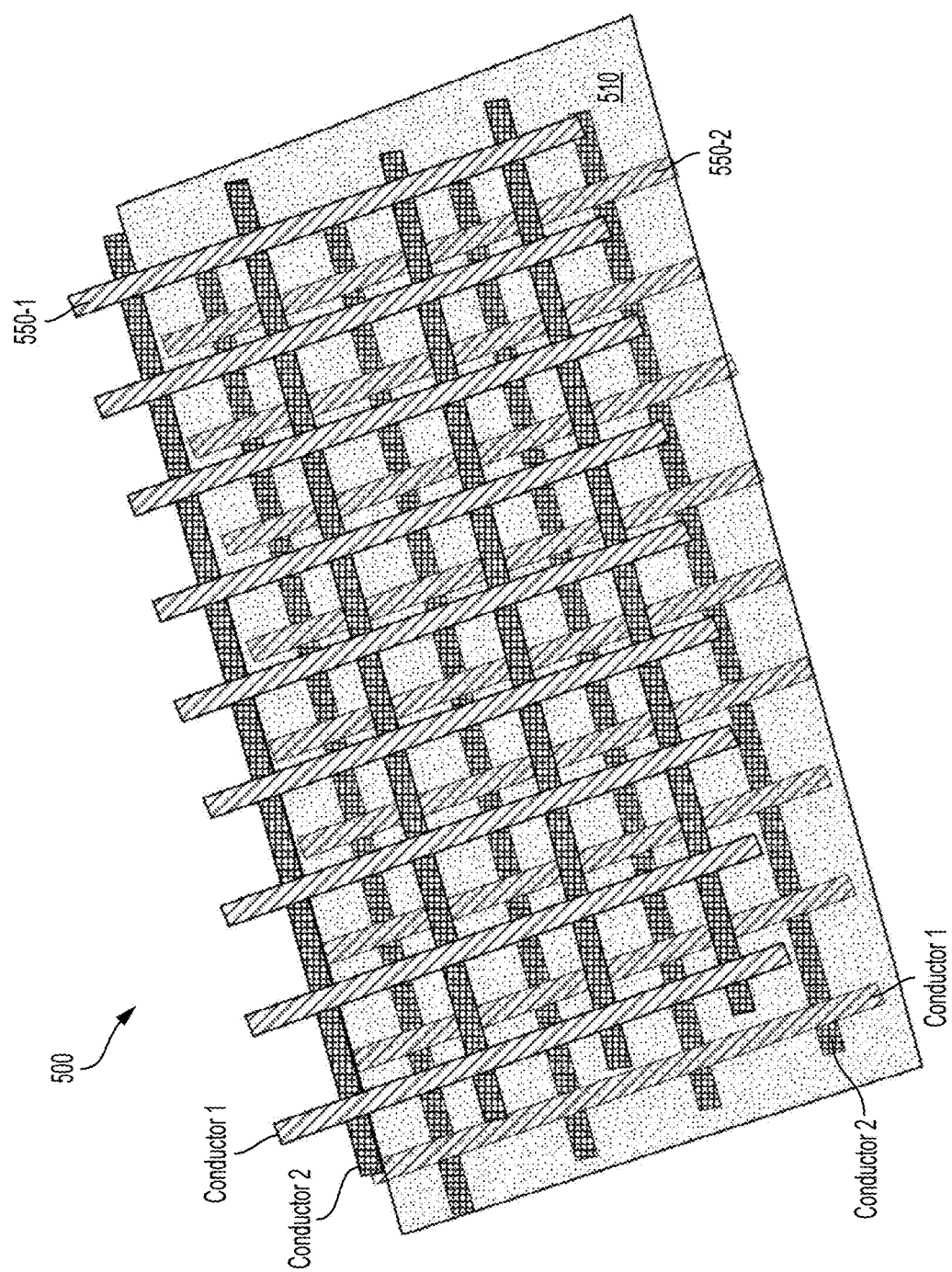
FIG. 5 is a perspective view of a multilayer thermopile mesh structure according to aspects of the present disclosure.

FIG. 5 is a perspective view of a multilayer thermopile mesh sensor 500 according to aspects of the present disclosure. In FIG. 5, the multilayer thermopile mesh sensor 500 is composed of a first thermopile mesh sensor 550-1 stacked on a second thermopile mesh sensor 550-2 and separated by an insulation layer 510 (e.g., a dielectric barrier layer, or passivation barrier layer). The first thermopile mesh sensor 550-1 and the second thermopile mesh sensor 550-2 also include Conductor 1 and Conductor 2, similar to the configurations shown in FIGS. 4A and 4B. The first thermopile mesh sensor 550-1 and the second thermopile mesh sensor 550-2 are offset by a predetermined amount. In addition, a distance between the first thermopile mesh sensor 550-1 and the second thermopile mesh sensor 550-2 may be approximately 100 nanometers.

Although shown as including two layers, the multilayer thermopile mesh sensor 500 may include additional layers. For example, the multilayer thermopile mesh sensor 500 may be a 40 by 100 layered mesh with approximately 30 micron resolution, but generally each layer may have grid dimensions of 4 by N, where N is any number as desired for an application, for improving the accuracy of voltage-to-temperature conversions. Note that, in alternative embodiments, one or more of the layers of a multi-layer thermopile mesh may have its conductors form a mesh whose apertures are square, rectangular, rhomboid, trapezoidal, or any other suitable shape. In addition, the layers may be overlaid using any suitable offset, or no offset, between corresponding layer features. The multilayer thermopile mesh sensor 500 may be employed for mesh structures where the smaller grid dimension exceeds four.

Referring again to FIGS. 4A and 4B, in operation, the presence of thermal gradients (originating from a die of the SoC 430) result in voltage gradients across the thermopile mesh sensor (450/460). According to aspects of the present disclosure, these voltage gradients enable temperature estimation (or detection) at interior mesh junctions within the active region of the SoC 430 (e.g., near CPU cores of the SoC 430). That is, the voltage gradients enable temperature detection at interior mesh junctions within the active region of the SoC 430 based on mesh voltages measured at the perimeter wire terminals of the thermopile mesh sensor (450/460), outside the active regions.

Figure 7:
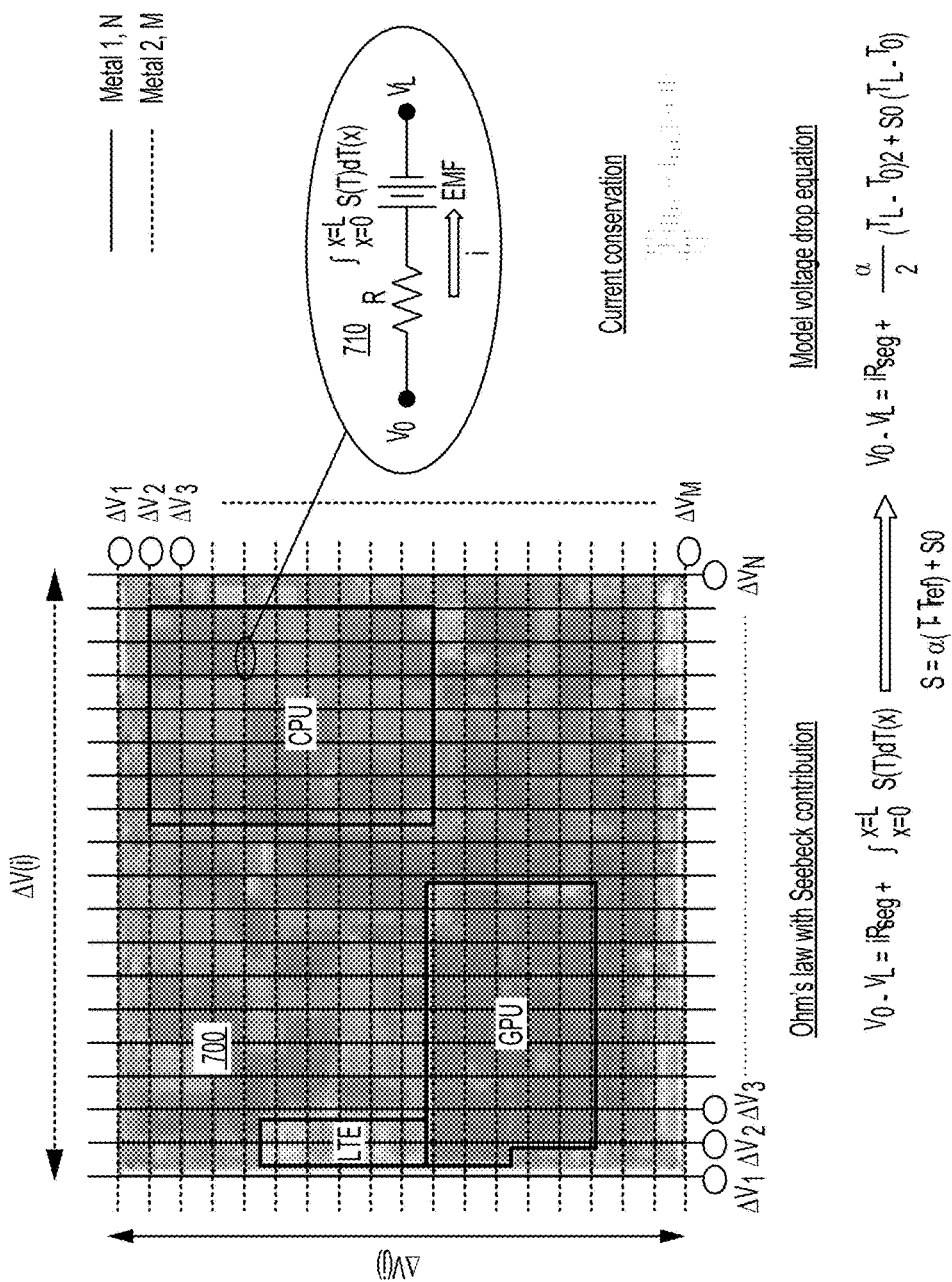
FIG. 7 is a plan view of a thermopile mesh for computing a temperature map of a system on chip (SoC) including a multicore chip, according to aspects of the present disclosure.

For example, differential voltages are sequentially measured (sweeping wire-terminal-by-wire-terminal around the perimeter) using, for example, a multiplexer and one common line to an analog-digital-converter (ADC). A logic circuit is then used to transform the measured voltages into a temperature map using a thermo-physical model, for example, as shown in FIG. 7. This thermo-physical model enables temperature detection at interior mesh junctions within the active region of the SoC 430 based on mesh voltages measured at the perimeter of the thermopile mesh sensor (450/460), outside the active regions. According to aspects of the present disclosure, thermal management circuitry and logic shown in FIG. 2 may be used to compute the thermo-physical model for temperature detection at interior mesh junctions within the active region of the SoC 430.

Figure 6A:
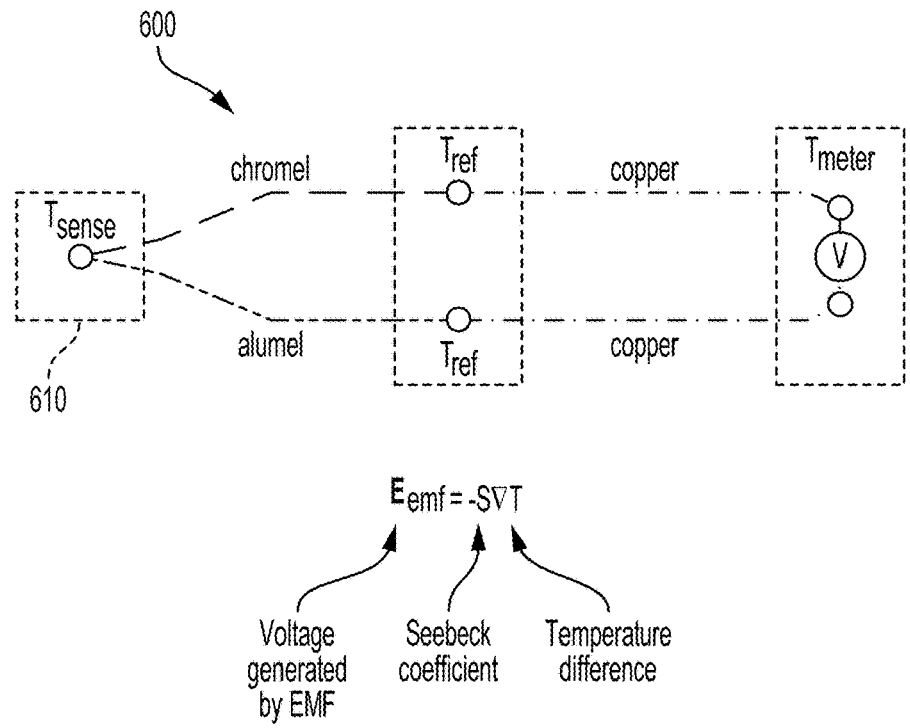
FIG. 6A is an example of a semiconductor thermocouple Seebeck effect.

FIG. 6A is schematic illustration of an exemplary thermocouple 600 operating based on the Seebeck effect. Thermocouples are a widely used type of temperature sensor. A thermocouple produces a temperature-dependent voltage as a result of the thermoelectric effect (also known as electromagnetic field (EMF)), and the voltage produced can be interpreted to measure temperature. The EMF/voltage is generated by the dissimilar metals. As a result, the temperature at element 610 can be determined as a result of the voltage difference across the wires, as determined according to the product of the Seebeck coefficient (S) and a temperature difference ($\Delta T$).

Figure 6B:
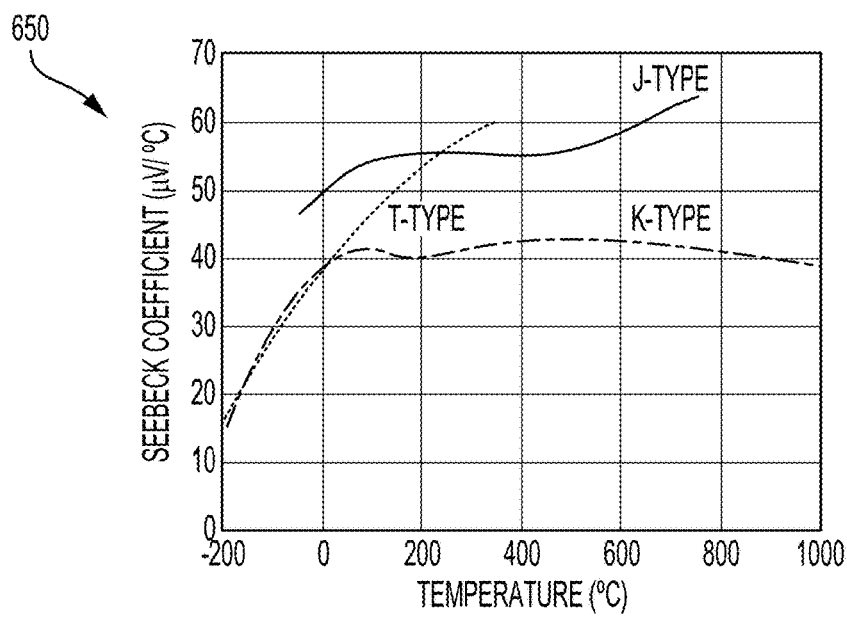
FIG. 6B is a graph illustrating different temperature ranges for different types of wiring material.

FIG. 6B is a graph 650 illustrating different temperature ranges for different types of wiring material. For example, various pairs of metals or metal alloys may be selected (e.g., T-type, J-type, K-type) and their different temperature ranges can be determined using the graph 650. In this example, wiring metals such as chromel (a nickel alloy of, e.g., 90% nickel and 10% chromium), alumel (a nickel alloy of, e.g., 95% nickel, 2% aluminum, 2% magnesium, and 1% silicon), and copper are shown, but other metals are possible according to aspects of the present disclosure.

It is important to note that FIG. 6B shows the effective Seebeck effect of pairs of metals. A larger effective Seebeck coefficient provides higher sensitivity in thermocouple measurements and is thus desirable. For the thermopile mesh, the absolute Seebeck coefficients of each metal or alloy should be known, not simply the effective Seebeck coefficient of the two metals in a traditional thermocouple circuit. For improving measurement sensitivity for the thermopile mesh, the magnitude of the absolute Seebeck coefficient should be increased for each metal or metal alloy. Furthermore, one should ideally be positive and the other negative to increase the relative difference in absolute Seebeck coefficients, as is common with traditional thermocouples.

As shown in FIGS. 6A and 6B, the Seebeck coefficient (also known as thermo-power, thermoelectric power, and thermoelectric sensitivity) of a material is a measure of the magnitude of an induced thermoelectric voltage in response to a temperature difference across that material. The thermoelectric voltage is induced by the Seebeck effect. The Seebeck coefficient varies based on the material (e.g., conductive material or metal) combination that is used, as shown in FIG. 6B.

For example, the Seebeck coefficient may be represented in units of microvolts per degrees centigrade. In some implementations, chromel and alumel make up the two conductors of the thermopile mesh, the same metals used in a traditional K-type thermocouple, as shown in FIG. 6A. These two alloys serve the thermopile mesh well due to both having large absolute Seebeck coefficients with one being positive (chromel) and one being negative (alumel). Some other conductive materials that are frequently used in SoC fabrication can be used for a thermocouple, including: (1) tungsten; (2) titanium nitride; or (3) titanium. Another conductive material that may be used for the thermocouple is copper. Cobalt, ruthenium, cobalt-tungsten, and phosphide are other possible materials that may be used for a thermocouple.

FIG. 7 illustrates a thermopile mesh 700 for computing a thermal (temperature) map of an SoC including a multicore chip, according to aspects of the present disclosure. In this aspect of the present disclosure, differential voltages are sequentially measured by sweeping wire-terminal-by-wire-terminal around the perimeter of the thermopile mesh 700. The measured voltages are then transformed into a temperature map using a thermo-physical model. This thermo-physical model enables temperature detection at interior mesh junctions within the active region of the SoC 430 based on mesh voltages measured at the perimeter of the thermopile mesh 700, outside the active regions.

Computation of the thermo-physical map may involve calculating a temperature of each junction in the N by M rows and columns of the thermopile mesh 700. Integration of an EMF across the thermopile mesh 700 involves knowledge of voltage difference across each wire. Once voltages are measured, an EMF can be computed, which can be done by numerical and/or analytical methods. One can derive the temperature field (e.g., a temperature at each node within the mesh) by measuring the voltages at the wire terminals or peripheral nodes. The thermo-physical model provides accurate results for a mesh with a grid size of 4×N, assuming all peripheral voltages are known. If the smallest dimension of the grid exceeds four, and only peripheral voltages are known, the model system of equations will be slightly under-constrained and some error may be introduced. The magnitude of this error may depend on dimensions and operating conditions, but may typically be assumed to be less than 1° C.

Perimeter voltages around the thermopile mesh 700 may be used to determine internal temperatures within the active region of the SoC multicore chip by computing a thermo-physical model as follows.

The thermo-physical model may be based on incorporation of the Seebeck effect into the well-known Ohm's law, as shown in FIG. 7. This is also shown as equation (1), in which i represents current, Rseg represents a segment electrical resistance, and S represents an absolute Seebeck coefficient, T is the temperature, and x is the direction along one mesh segment from one node, x=0 to the next node x=L.

$$V_0 - V_L = iR_{seg} + \int_{x=0}^{x=L} S(T) dT(x) \quad (1)$$

In this example, the voltage-drop equation is applied segment by segment (e.g., from one node (x=0) to the next (x=L).) Each segment can be thought of as a resistor and an electromagnetic field (EMF) in series. For example, one mesh segment 710 is shown as a resistor R in series with an EMF. The model voltage drop equation is used with traditional circuit analysis (Kirchhoff's voltage loop and current rules) using the approximation in equation (2), where a linear assumption of the absolute Seebeck coefficient is assumed; for example, $S=S_0$ when T is equal to some reference temperature, $T_{ref}$; and $\alpha$ is a material dependent coefficient. Incorporation of equation (2) into equation (1), yields the voltage drop equation (3), which is used together with the current conservation statement applied at each mesh node, equation (4):

$$S = \alpha(T - T_{ref}) + S_0 \quad (2)$$

$$V_0 - V_L = iR_{seg} + \frac{\alpha}{2}(T_L - T_0)^2 + S_0(T_L - T_0) \quad (3)$$

$$\Sigma_{i,j}(i_{in} - i_{out}) = 0 \quad (4)$$

For some applications, it is desirable to measure perimeter voltages to determine internal temperatures. This is possible with no or negligible model error for any thermopile mesh of size 4×N. Higher density is obtained by layering of 4×N meshes separated by insulating barriers (e.g., via atomic layer deposition), or a single high density thermopile mesh may be used with small error.

Figure 8:
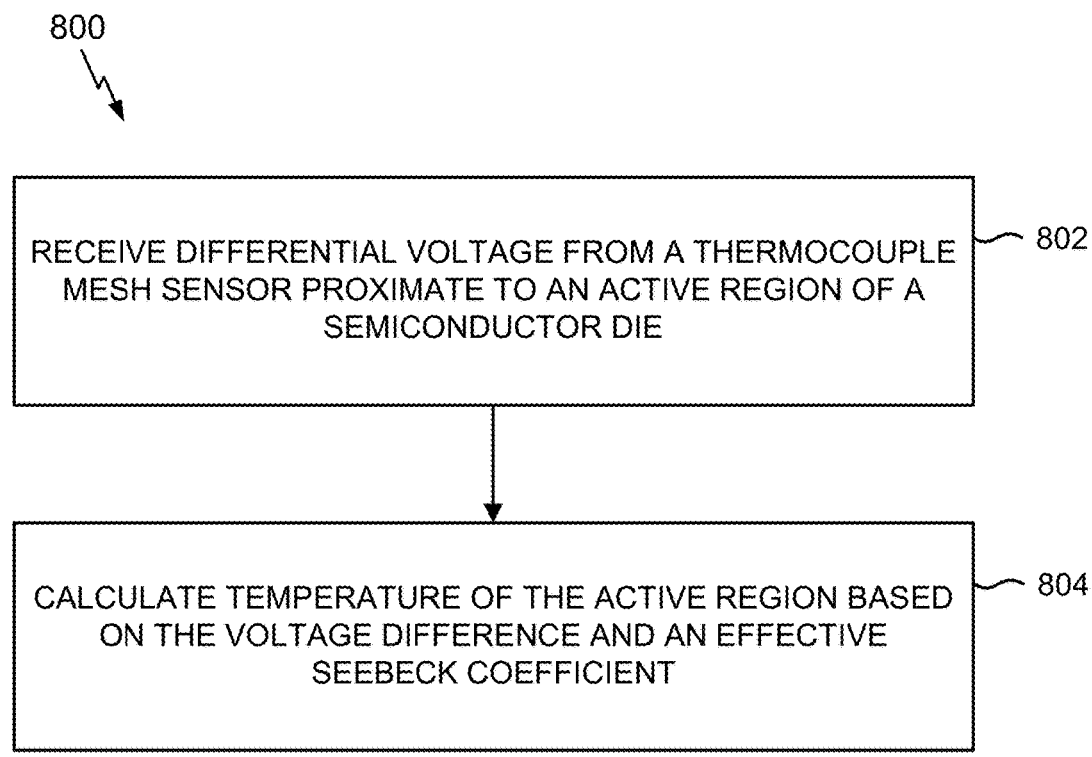
FIG. 8 is a flow diagram of an example method of estimating a thermal map of a semiconductor die, according to aspects of the present disclosure.

FIG. 8 is a process flow diagram illustrating a method 800 of estimating a thermal map of a semiconductor die, according to an aspect of the present disclosure. In block 802, an SoC device (e.g., including multiple CPU cores), receives a number of voltages in accordance to the number of exterior nodes or wire terminals of a thermopile mesh sensor coupled to an active region of the SoC device. For example, as shown in FIGS. 4A and 4B, the thermopile mesh sensor (450/460) may determine internal voltages (e.g., estimated voltages) in an active area of the SoC 430. In block 804, the SoC device calculates a temperature map of the active region based on the voltage difference and an effective Seebeck coefficient.

For example, as shown in FIG. 7, a thermo-physical model is used for temperature detection at interior mesh junctions within the active region of the SoC 430 (FIGS. 4A and 4B) based on mesh voltages measured at the perimeter of the thermopile mesh 700, outside the active regions. This process improved the accuracy of SoC active region temperature mapping relative to conventional methods. These conventional methods rely on sub-optimal placement, resulting in insufficient spatial coverage of the sensors, leading to misleading temperature readings. These conventional temperature sensing implementations, therefore, produce inaccurate temperature measurements.

Figure 9:
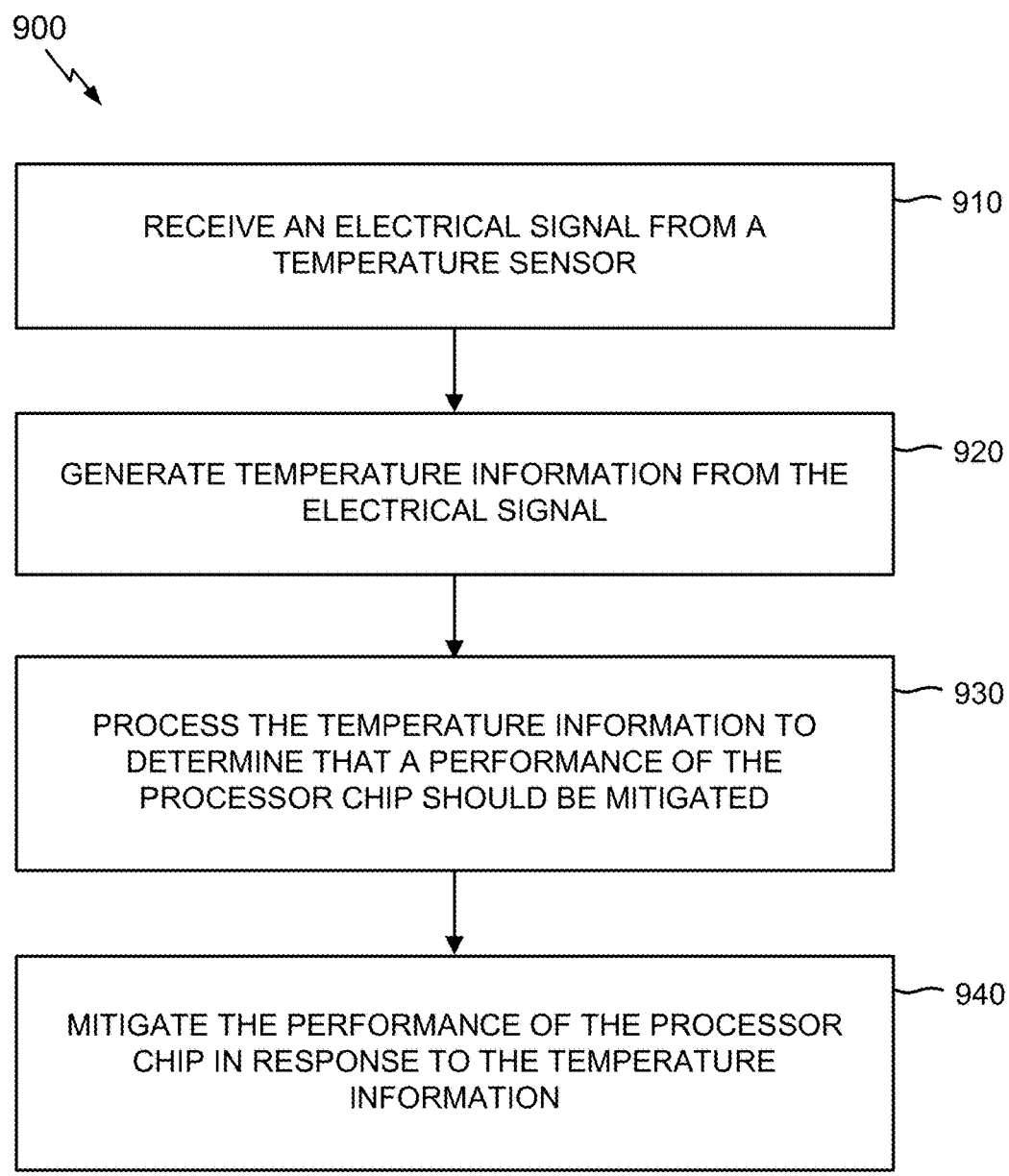
FIG. 9 is a flow diagram of an example method of thermal mitigation, according to aspects of the present disclosure.

FIG. 9 is a flow chart illustrating a method 900 of providing thermal mitigation using SoC active area temperatures using, for example, the thermopile mesh sensor (450/460) of FIGS. 4A and 4B, according to aspects of the present disclosure. In one example, the method 900 is performed by the thermal management unit 335, such as described above with respect to FIG. 3. The method 900 assumes that the temperature threshold is already known for the particular component. As the device operates during normal use, the thermal management unit 335 performs the actions of the method 900. Therefore, as a human user leaves the device idle, makes phone calls, sends text messages, watches videos, and the like, the thermal management unit 335 continually performs the blocks of the method 900 to ensure that the temperature of device components does not reach corresponding pre-defined levels for the components does not reach a pre-defined level. It is noted in this example that a reading of temperature is taken at a temperature sensor that is in-package along with the SoC or taken at an on-chip thermopile mesh temperature sensor. The thermal mitigation processing (e.g., block 930 and block 940) is performed by logic at the SoC itself.

At block 910, the system receives an electrical signal from an on-chip mesh, shown as the thermocouple mesh 250. The thermocouple mesh 250 may be a thermopile mesh sensor (450/460), as shown in FIGS. 4A and 4B.

At block 920, the system generates temperature information from the electrical signal. For instance, in the aspect of FIG. 3, the electrical signal from the thermocouple mesh 250 is fed to an operational amplifier and then to an ADC, where the output of the ADC is a digital signal indicative of the temperature at a node of the thermocouple mesh 250.

At block 930, the system processes the temperature information to determine that a performance of the processor chip should be mitigated. For instance, in the example of FIG. 3, the thermal management unit 335 compares the temperature information against a programmed temperature threshold. The value of the temperature threshold may be any suitable value, and it represents a temperature of the temperature sensor that is associated with a temperature limit, such as a temperature that is detrimental to a device component.

At block 940, the system mitigates the performance of the processor chip in response to the temperature information. For instance, in the example of FIG. 3, the thermal management unit 240 compares the temperature information to the programmed threshold. If the temperature information indicates that the temperature of the temperature sensor is greater than the threshold, then the thermal management unit 240 may reduce an operating parameter of the processor chip. The principles described may be applied to any suitable computer processor, such as shown in FIGS. 4A and 4B.

In one example, the thermal management unit 335 reduces an operating frequency of one or more cores in the SoC, thereby reducing power consumption. Block 940, however, may include any suitable thermal mitigation technique, such as putting cores in an idle state. The process continues to operate as the SoC operates, continually measuring the power consumption and taking appropriate mitigation steps according to the algorithm.

The scope is not limited to the specific method shown in FIG. 9. Other aspects may add, omit, rearrange, or modify one or more actions. For instance, the method 900 may also include functionality to return the clock frequency to a previous level or otherwise to increase the clock frequency when thermal mitigation is no longer desired, such as after determining that the measured temperature has decreased beyond the same or a different threshold.

In some implementations, a voltage at each perimeter junction (node) or wire terminal of a thermopile mesh is measured. From these measured voltages, the temperatures are derived at all interior and exterior mesh junctions (nodes). For example, a node may be defined as an intersections between the two dissimilar metals. The transformation between voltage to temperature relies upon the Seebeck effect, which is a phenomenon in which a temperature difference between two dissimilar electrical conductors or semiconductors produces a voltage difference between the two substances. It should be noted that, although the mesh may be used to calculate absolute temperatures (especially when provided with one or more reference temperatures), it may also be used to detect relative hotspots without regard to their actual scalar value (particularly when a reference temp is unavailable/not used).

The mesh structure (e.g., thermocouple mesh structure/thermopile mesh sensor) can be placed at different regions of the system on chip, so long as the mesh structure covers the desirable portions of the active region of a semiconductor device (e.g., modem controller die). One or more of the nodes (e.g., where the two different wire materials intersect) of the mesh may be connected to the system on chip with through silicon vias (TSVs). For example, a thermopile mesh sensor may be placed or deposited at a backside of the semiconductor device (e.g., a silicon substrate), as shown in FIG. 4A, and/or in a middle-of-the-line (MOL) region of the semiconductor device, as shown in FIG. 4B. A mask may be used to separate the thermocouple mesh from contacting certain interconnects within the semiconductor device.

According to a further aspect of the present disclosure, a semiconductor device is described. The semiconductor device includes means for sensing. The sensing means may include the thermopile mesh sensor (450/460), as shown in FIGS. 4A and 4B. In another aspect, the aforementioned means may be any module or any apparatus configured to perform the functions recited by the aforementioned means.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

In addition to storage on a non-transitory computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice-versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein, may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Computer-readable media includes both computer storage media and communication media, including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD) and Blu-ray disc. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, in which reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A semiconductor device, comprising:
a semiconductor die having an active region; and
a thermocouple mesh proximate to the active region, the thermocouple mesh comprising:
a first set of wires of a first material extending in a first direction, and
a second set of wires of a second material, different from the first material, extending in a second direction that is different than the first direction, in which the thermocouple mesh is within a middle-of-line (MOL) region of the semiconductor die.

2. A semiconductor device, comprising:
a semiconductor die having an active region; and
a thermocouple mesh proximate to the active region, the thermocouple mesh comprising:
a first set of wires of a first material extending in a first direction, and
a second set of wires of a second material, different from the first material, extending in a second direction that is different than the first direction, in which the thermocouple mesh is on a back surface of the semiconductor die.

3. The semiconductor device of claim 2, further comprising vias coupling each wire to the active region of the semiconductor die.

4. The semiconductor device of claim 3, in which the vias are coupled to nodes of the thermocouple mesh where the first set of wires are arranged to intersect with the second set of wires.

5. A semiconductor device, comprising:
a semiconductor die having an active region; and
a thermocouple mesh proximate to the active region, the thermocouple mesh comprising:
a first set of wires of a first material extending in a first direction, and
a second set of wires of a second material, different from the first material, extending in a second direction that is different than the first direction, in which the thermocouple mesh is integrated within an interposer of the semiconductor device.

6. The semiconductor device of claim 1, in which the first direction of the thermocouple mesh is orthogonal to the second direction.

7. The semiconductor device of claim 1, in which the thermocouple mesh is a multilayer thermopile mesh comprising a plurality of overlaying thermocouple mesh layers.

8. The semiconductor device of claim 1, in which the first set of wires and the second set of wires are coupled to form a plurality of nodes.

9. The semiconductor device of claim 8, in which:
the plurality of nodes comprises a set of peripheral nodes at a periphery of the thermocouple mesh and a set of internal nodes located internal to the thermocouple mesh;
the semiconductor device further comprises a controller and voltage measurement devices connected to the peripheral nodes and the controller;
the voltage measurement devices to provide voltage measurements of the peripheral nodes to the controller; and
the controller to use the received voltage measurements to calculate estimated voltages at the internal nodes.

10. The semiconductor device of claim 9, in which the controller is to use the voltage measurements and the estimated voltages to calculate relative temperatures at the plurality of nodes.

11. The semiconductor device of claim 10, in which:
the semiconductor device further comprises a temperature sensor to provide the temperature reading to the controller; and
the controller is to use the temperature reading in conjunction with the calculated relative temperatures to determine absolute temperatures at one or more of the plurality of nodes.

12. The semiconductor device of claim 1, in which:
the semiconductor device comprises a system on chip (SoC) including a central processing unit (CPU), a graphics processing unit (GPU), and a communications module; and
the thermocouple mesh to proximately overlay at least one of the CPU, the GPU, and the communications module.

13. A method of estimating a thermal map of a semiconductor die, comprising:
receiving a differential voltage from a thermocouple mesh in a middle-of-line (MOL) region of the semiconductor die directly proximate to an active region of the semiconductor die; and
calculating a temperature of the active region based on the differential voltage and an effective Seebeck coefficient.

14. The method of claim 13, in which receiving the differential voltage further comprises sequentially measuring the differential voltages around a perimeter of the thermocouple mesh, outside the active region; and
in which calculating the temperature comprises transforming the differential voltages around the perimeter of the thermocouple mesh into a temperature map, and determining the temperature at junctions of the thermocouple mesh in the active region according to the temperature map.

15. The method of claim 13, in which receiving the differential voltage further comprises receiving a first voltage difference of a first wire of the first set of wires and a second wire of the second set of wires at a node of the thermocouple mesh, the first wire and the second wire intersecting at the node of the thermocouple mesh, the first wire comprising a first material, the second wire comprising a second material.

16. The method of claim 13, in which receiving the differential voltage further comprises receiving a voltage difference from each of a first set of wires of a first material extending in a first direction, and a second set of wires of a second material, different from the first material, extending in a different direction relative to the first direction.

17. A semiconductor device, comprising:
a semiconductor die having an active region; and
means for sensing a temperature, proximate to the active region, the sensing means comprising a first set of wires of a first material extending in a first direction, and a second set of wires of a second material, different from the first material, extending in a second direction different than the first direction, in which the thermocouple mesh is within a middle-of-line (MOL) region of the semiconductor die.

18. The semiconductor device of claim 17, in which a layer of the sensing means is on a back surface of the semiconductor die.

19. The semiconductor device of claim 18, further comprising vias coupling each wire to the active region of the semiconductor die.

20. The semiconductor device of claim 17, in which a layer of the thermocouple mesh is integrated within an interposer of the semiconductor device.

21. The semiconductor device of claim 17, in which the first set of wires and the second set of wires are coupled to form a plurality of nodes.

22. The semiconductor device of claim 21, in which:
the plurality of nodes comprises a set of peripheral nodes at a periphery of the means for sensing and a set of internal nodes located internal to the means for sensing;
the semiconductor device further comprises a controller and one or more voltage measurement devices connected to the peripheral nodes and the controller;
the one or more voltage measurement devices to provide voltage measurements of the peripheral nodes to the controller; and
the controller to use the received voltage measurements to calculate estimated voltages at the internal nodes.

23. The semiconductor device of claim 22, in which the controller is to use the voltage measurements and the estimated voltages to calculate the relative temperatures at the plurality of nodes.

24. The semiconductor device of claim 23, in which:
the semiconductor device further comprises a temperature sensor to provide the temperature reading to the controller; and
the controller is to use the temperature reading in conjunction with the calculated relative temperatures to determine absolute temperatures at one or more of the plurality of nodes.

25. The semiconductor device of claim 17, in which:
the semiconductor device comprises a system on chip (SoC) including a central processing unit (CPU), a graphics processing unit (GPU), and a communications module; and
the means for sensing proximately overlays at least one of the CPU, the GPU, and the communications module.

26. A non-transitory computer-readable medium having program code recorded thereon for estimating a thermal map of a semiconductor die, the program code comprising:
program code to receive a differential voltage from a thermocouple mesh in a middle-of-line (MOL) region of the semiconductor die directly proximate to an active region of the semiconductor die; and
program code to calculate a temperature of the active region based on the differential voltage and an effective Seebeck coefficient.

27. The non-transitory computer-readable medium of claim 26,
in which the program code to receive the differential voltage further comprises program code to sequentially measure the differential voltage at each node around a perimeter of the thermocouple mesh, outside the active region; and
in which the program code to calculate the temperature comprises program code to transform the differential voltages around the perimeter of the thermocouple mesh into a temperature map, and to determine the temperature at junctions of the thermocouple mesh in the active region according to the temperature map.

28. The non-transitory computer-readable medium of claim 26, in which the program code to receive the differential voltage further comprises program code to receive a voltage difference of a first wire and a second wire at a node of the thermocouple mesh, the first wire and the second wire intersecting at the node of the thermocouple mesh, the first wire comprising a first material, the second wire comprising a second material.

* * * * *